United States Patent [19]

Kawano et al.

[11] 3,947,288
[45] Mar. 30, 1976

[54] EXPANSIVE CEMENT ADDITIVE AND PROCESS FOR PRODUCING THE SAME

[75] Inventors: Toshio Kawano; Takaro Mori, both of Kawasaki; Hachiro Kubota, Tokyo, all of Japan

[73] Assignee: Onoda Cement Co., Ltd., Yamaguchi, Japan

[22] Filed: June 24, 1974

[21] Appl. No.: 482,506

[30] Foreign Application Priority Data
June 29, 1973 Japan.................................. 48-72804

[52] U.S. Cl. .................... 106/314; 106/89; 106/109
[51] Int. Cl.² .......................................... C04B 31/02
[58] Field of Search........................ 106/89, 314, 109

[56] References Cited
UNITED STATES PATENTS

| | | | |
|---|---|---|---|
| 3,447,937 | 6/1969 | Hersey et al. | 106/89 |
| 3,785,844 | 1/1974 | Kawano | 106/314 |

*Primary Examiner*—J. Poer
*Attorney, Agent, or Firm*—Flynn & Frishauf

[57] ABSTRACT

An improved finely pulverized expansive cement additive which causes the cement mortar or concrete mixed therewith to bear increased chemical prestressing property, the clinker of said additive substantially consisting of alite crystals containing fine crystals of calcium oxide therein and a phase substantially consisting of optic-microscopically amorphous calcium sulfate in which said alite crystals are dispersed.

8 Claims, 5 Drawing Figures

EXPANSIVE CEMENT ADDITIVE AND PROCESS FOR PRODUCING THE SAME

This invention relates to that described in the specification of U.S. Pat. No. 3,785,844 under the title "Expansive cement additives and process for producing the same", and assigned to the same assignee as in the present application. These expansive cement additives of both inventions enable cement mortar or concrete to retain a markedly excellent chemical prestressing property over a long period.

The above-mentioned U.S. Pat. No. 3,785,844, hereinafter referred to as "the U.S. Patent", sets forth an expansive cement additive of pulverized clinker, whose original clinker substantially consists of alite (3CaO.SiO$_2$) crystals and calcium oxide crystals each dispersed in a vitreous interstitial substance essentially consisting of three phases of 4CaO.Al$_2$O$_3$.Fe$_2$O$_3$, 3CaO.Al$_2$O$_3$ and CaSO$_4$; the crystal sizes of said alite and calcium oxide ranging from 100 to 200 microns and from 15 to 60 microns respectively, the content of calcium oxide crystals in the vitreous interstitial substance being in a range from 30 to 80 percent by weight based on the clinker, and the amount of said vitreous interstitial substance being in a range from 10 to 38 percent by weight based on the clinker. The mixing ratio of gypsum as converted to CaSO$_4$ in the raw materials ranges from 10 to 20 percent by weight based on the total weight of CaO component contained in said raw materials.

The above-mentioned pulverized expansive cement additive has such fineness that 1 to 40 percent by weight of said clinker is retained on a sieve of 88-micron mesh.

The above-mentioned expansive cement additive of the U.S. Patent containing calcium sulfate has greater weather-resistance than that of the U.S. Patent for the case containing no calcium sulfate. This originates from the fact that, in the former additive, the addition of calcium sulfate enables the mean sizes of alite and calcium oxide crystals to be larger than those of the latter additive containing no calcium sulfate.

In the additive of the U.S. Patent, the expansion caused by the hydration of calcium oxide crystals is to be so restricted as to take a suitable timing corresponding to the initial duration of cement curing by means of covering the surface of calcium oxide crystals with the vitreous interstitial substance. However, the vitreous interstitial substance contains occasionally very fine apertures which cause the substance to crumble to a certain degree. Therefore, it happens that the covered interstitial substance is torn off from the surface of calcium oxide crystals when the original clinker is violently pulverized. Furthermore, the uncovered calcium oxide crystals are liable to be finely crushed when the pulverization goes on. These phenomena may reduce the effect of timely restricting the expansion of cement mortar or concrete mixed with the additive, and weather-resistance of the additive, resulting in difficulties in stable production and storage of the additive.

An object of this invention is to improve the aforementioned expansive cement additive of the U.S. Patent in order to increase smoothly the expansion of cement mortar or concrete during the initial curing period of 5 to 7 days.

Another object of this invention is to improve said additive of the U.S. Patent in order to increase the weather-resistance of the additive.

Another object of this invention is to provide an improved excellent cement additive which enables the cement mortar or concrete mixed therewith to bear increased chemical prestressing property with a smaller amount than in the U.S. Patent.

Further object of this invention is to provide an expansive cement additive whose quality is constantly stable.

These objects can be attained in accordance with the present invention by preparing a finely pulverized expansive cement additive, the original clinker of which essentially consists of alite (3CaO.SiO$_2$) crystals of comparatively large mean size, said alite crystals containing fine crystals of calcium oxide therein and a phase substantially consisting of optic-microscopically amorphous calcium sulfate in which said alite crystals are dispersed.

Other important objects and advantageous features of this invention will be apparent from the following description and the drawing attached, wherein specific embodiments of this invention are set forth in detail. In the drawing:

FIG. 1 presents fourteen curves showing the relationship between the period of water curing and the linear expansion coefficient of various types of mortar consisting of 95 parts by weight of normal Portland cement and 5 parts by weight of expansive cement additives of this invention and others whose chemical compositions are shown in Table 1 of this specification;

Figure 1:
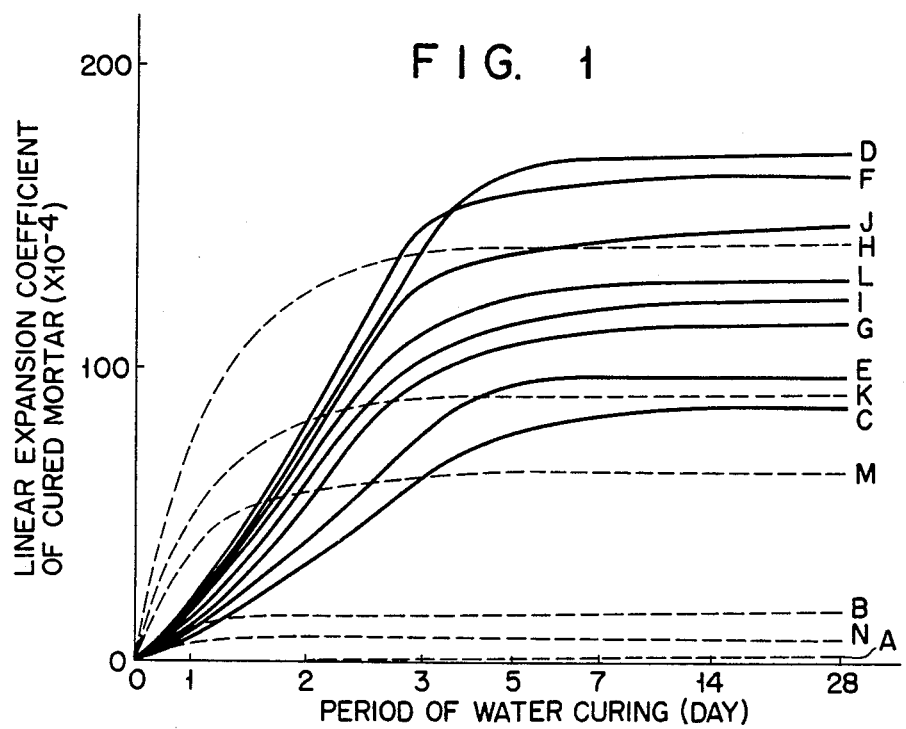

A clinker for the expansive cement additive of this invention can be obtained by mixing raw materials of a calcareous substance, siliceous substance and gypsum in a manner allowing a mol ratio of CaO/SiO$_2$ to range from 4.2 to 9.2 and a mol ratio of CaSO$_4$/SiO$_2$ from 0.12 to 1.40; pulverizing said mixture to such fineness that a residue on a sieve of 88-micron mesh accounts for about 1 to 40 percent by weight based on the mixture; and burning the pulverized mixture of raw materials in an oxidizing atmosphere at a temperature of 1350° to 1550°C, said burning being stopped before decomposition of the gypsum mixed reaches 15 to 40 percent by weight.

The clinker thus obtained substantially consists of alite crystals containing fine crystals of calcium oxide, therein and a phase of optic-microscopically amorphous calcium sulfate in which said alite crystals are dispersed. The ranges of crystal sizes of said alite and calcium oxide are 50 to 800 microns, and 5 to 30 microns respectively, and the content of calcium oxide crystals distributed in the alite crystals is at least 20 percent by weight based on the clinker and at least 50 percent by weight based on the total weight of calcium oxide crystal contained in the clinker. The content of calcium sulfate phase is in the range of from 5 to 30 percent by weight based on the clinker. Such a microstructure of the clinker may be well understood by referring, for example, to a microscopic sketch shown in FIG. 2. Detailed explanation of FIG. 2 will be set forth hereinafter.

In the burning step, the phase of calcium sulfate plays two roles of acceleration of alite crystal growth as a so-called mineralizer and immanent distribution of calcium oxide crystals in the alite crystals. In this step, the above-mentioned effects of calcium sulfate phase would not be expected if the decomposition of calcium sulfate occurs in a short time. Therefore, it is necessary to control the rate of temperature increase in the burning step, and preferable to raise the burning temperature in a similar manner to the case of cement clinker burning.

When mixing the raw materials, less than 4.2 of $CaO/SiO_2$ mol ratio under the condition of $CaSO_4/SiO_2$ mol ratio being in the range from 0.12 to 1.40 results in that the amount of calcium oxide crystals distributed in the alite crystals becomes less than 20 percent by weight based on the clinker. The use of an expansive cement additive prepared by pulverizing this clinker causes the consumption thereof to be very low. Further, more than 9.2 of $CaO/SiO_2$ mol ratio under the same condition as the above results in that the amount of calcium oxide crystals immanently distributed in the alite crystals becomes less than 50 percent by weight based on the total weight of calcium oxide crystals contained in the clinker. The expansive property of the cement additive prepared by pulverizing this clinker closely resembles that of the U.S. Patent.

More than 1.40 of $CaSO_4/SiO_2$ mol ratio under the condition of $CaO/SiO_2$ mol ratio being in the range from 4.2 to 9.2 results in a melting point of the clinker of lower than 1,350°C to obstruct the growth of alite crystals. Less than 0.12 of $CaSO_4/SiO_2$ mol ratio under the same condition as the above gives rise to decreased effects of alite crystal growth and immanent distribution of calcium oxide crystals in the alite crystals.

Regarding the burning temperature of clinker, the growth of alite crystals becomes insufficient if the burning is effected at temperatures lower than 1350°C, resulting in that the immanent distribution of calcium oxide crystals in the alite crystals is not carried out. On the other hand, burning temperatures higher than 1550°C cause decomposition of the calcium sulfate phase owing to which a tolerable amount of $SO_3$ fumes escapes from of the clinker structure, giving rise to occurrence of apertures therein. The heating should be carried out in an oxidizing atmosphere. When carried out in a reducing atmosphere, the alite crystals which have grown in the clinker decompose immediately, so that the calcium oxide crystals can not immanently be distributed into the alite crystals.

The raw materials generally contain some amounts of such impurities as iron oxide, alumina or magnesia. These impurities may be distributed in the phase of calcium sulfate together with an excess amount of calcium oxide crystals. Iron oxide mixed in an amount less than about 3 percent by weight based on the clinker, for example, preferably accelerates the growth of calcium oxide crystals contained in the clinker. When, however, the content of iron oxide exceeds 3 percent, the melting point of a clinker was lowered to obstruct the growth of alite crystals or increase the consumption of CaO because of the reaction between CaO and $Fe_2O_3$, thereby decreasing the amount of alite crystals or calcium oxide crystals immanently distributed therein.

Though the effect of $Al_2O_3$ or MgO contained in the clinker is not large, it is better to keep the content thereof as small as possible in order to obtain a far larger expansive effect of the additive.

As the raw material of a calcareous substance, lime, limestone or calcium hydroxide may be used. As the raw material of a siliceous substance, silica sand or silica stone may be used. Further, as the raw material of gypsum, dihydrate, hemihydrate or anhydrite may be used.

The present invention will be more fully described hereunder on the basis of experimental data.

Pure calcium carbonate, silicon dioxide and calcium sulfate dihydrate of reagent grade were mixed in different mol ratios of $CaO/SiO_2$ and $CaSO_4/SiO_2$ as shown in Table 1. The fourteen different mixture samples are designated as A, B, C, . . . and N.

These mixed raw materials were pelletized with water incorporated, and charged in an electric furnace whose temperature had been maintained at about 1,000°C in advance. The temperature of the materials inside the furnace was raised in increments of 5°C per minute up to between 1,450°C and 1,500°C. After being heated at said temperature for about 30 minutes, the furnace content was cooled rapidly to obtain various kinds of clinker.

The compositions of these clinkers and the immanent distribution ratios of calcium oxide crystals in the alite crystals to the clinkers are shown in Table 1. Said ratios were determined by means of a 280 fold direct-vision microscopic measurement with respect to each sliced clinker of about 17 microns thickness.

Table 1

| Sample | Mol ratio of compositions in raw materials mixed | | Composition of the clinker | | | | |
|---|---|---|---|---|---|---|---|
| | | | Composition of clinker (wt.% based on clinker) | | | CaO crystals dispersed in alite crystals (wt.% based on clinker) (B) | $\frac{(B)}{(A)} \times 100$ |
| | $\frac{CaO}{SiO_2}$ | $\frac{CaSO_4}{SiO_2}$ | Alite crystals | Total CaO crystals (A) | $CaSO_4$ phase | | |
| A | 4.1 | 0.06 | 77 | 20 | 3 | 0 | 0 |
| B | 7.4 | 0.10 | 47 | 50 | 3 | 0 | 0 |
| C | 4.2 | 0.12 | 74 | 20 | 6 | 20 | 100 |
| D | 7.9 | 0.21 | 44 | 50 | 6 | 33 | 66 |
| E | 4.4 | 0.23 | 70 | 20 | 10 | 20 | 100 |
| F | 8.5 | 0.40 | 40 | 50 | 10 | 30 | 60 |
| G | 4.9 | 0.57 | 60 | 20 | 20 | 20 | 100 |
| H | 11.0 | 1.15 | 30 | 50 | 20 | 23 | 46 |
| I | 5.2 | 0.76 | 55 | 20 | 25 | 20 | 100 |
| J | 9.2 | 1.40 | 30 | 45 | 25 | 23 | 51 |

Table 1-continued

| Sample | Mol ratio of compositions in raw materials mixed CaO/SiO$_2$ | CaSO$_4$/SiO$_2$ | Composition of the clinker Composition of clinker (wt.% based on clinker) Alite crystals | Total CaO crystals (A) | CaSO$_4$ phase | CaO crystals dispersed in alite crystals (wt.% based on clinker) (B) | $\frac{(B)}{(A)} \times 100$ |
| --- | --- | --- | --- | --- | --- | --- | --- |
| K | 12.8 | 1.68 | 25 | 50 | 25 | 19 | 38 |
| L | 5.6 | 1.00 | 50 | 20 | 30 | 20 | 100 |
| M | 15.7 | 2.52 | 20 | 50 | 30 | 15 | 30 |
| N | 4.0 | 0.21 | 75 | 15 | 10 | 15 | 100 |

The underlined values in Table 1 are out of the scope of the present claims appended hereto.

The clinkers shown in Table 1 were pulverized respectively to such extent that 1 to 40 weight percent of the powders were retained on a sieve of 88 micron mesh.

Fourteen types, corresponding to A to N, of cement mortar were prepared by mixing 95 weight parts of normal Portland cement, 5 weight parts of respective additives obtained, 20 weight parts of Toyoura standard sand and 60 weight parts of water. These mortar samples were molded into a cubical shape of 4 × 4 × 16 cm. The molded specimens were cured for one day in a curing box whose temperature was kept at 20°C and relative humidity at 90 percent. Thereafter the specimens were immersed in water at 20°C to measure the linear expansion coefficients of demolded specimens corresponding to the periods of water curing, the results being presented in FIG. 1. The symbols A to N in FIG. 1 correspond to those in Table 1.

As seen from FIG. 1, the linear expansion coefficients of the mortar specimens A, B and N were very small during all periods of water curing, indicating that the additives A, B and N can not be used practically at all. In the clinkers of A, B and N, the crystal size of alite was less than 10 microns and they contained almost no calcium oxide crystals immanently dispersed therein.

The curves H, K and M in FIG. 1 indicate that the corresponding cured mortars have sufficient maximum coefficients respectively. However, the maximum expansion coefficients of the mortar specimens H, K and M are reached in 2 to 3 days of the initial curing period. In order to obtain a good chemical prestressing property of cement additive, the cement mortar or concrete containing the additive should expand slowly and smoothly so that the maximum expansion is reached in 5 to 7 days of the initial curing period. Therefore, the additives obtained from the clinker H, K and M are not satisfactory in terms of the chemical prestressing property. These clinkers contained a comparatively large amount of calcium oxide crystals which were not dispersed immanently in the alite crystals.

Since the expansive cement additive of this invention has a good chemical prestressing property, the necessary mixing ratio of this additive to cement is lower than that of any other additive. Furthermore, the mechanical strength of cement mortar or concrete mixed with the additive of this invention is almost the same as that of plain cement mortar or concrete, because the additive of this invention contains a large amount of alite which is also a main cement mineral having a development of high early strength.

In general cases, the pulverized mixture of raw materials is burnt in a form of pellet, flake or powder per se. The duration of burning should be profitably changed in accordance with the condition of operation.

The process and the product of this invention will be more fully understood by referring to the following examples.

EXAMPLE 1

Raw materials consisting of 79 weight parts of lime, 10 weight parts of silica stone and 11 weight parts of calcium sulfate anhydrite, whose fineness and chemical composition are shown in Table 2, were mixed together in a manner allowing the CaO/SiO$_2$ mol ratio to be 8.1 and the CaSO$_4$/SiO$_2$ mol ratio to be 0.46. After flaking the mixture under about 900 kg/cm$^2$ pressure, the mass of flake was charged in an electric furnace whose temperature had been maintained at about 1,000°C in advance. The charged mass was heated up in increments of 5°C per minute to 1,400°C. After being heated at 1,400°C for 30 minutes, the charged mass was cooled rapidly to obtain a clinker whose chemical composition is shown in Table 3. The data in Tables 2 and 3 are within the scope of the present claims appended hereto.

Table 2

| Raw material | Fineness Over 88 micron mesh (wt.%) | Fineness and chemical analysis of Raw Materials Chemical analysis (wt.%) | | | | | | | |
| --- | --- | --- | --- | --- | --- | --- | --- | --- | --- |
| | | Ignition loss | CaO | SiO$_2$ | SO$_3$ | Fe$_2$O$_3$ | Al$_2$O$_3$ | MgO | Total |
| Lime | 4.8 | 5.9 | 90.9 | 1.4 | 0.3 | 0.3 | 0.5 | 0.5 | 99.8 |
| Silica stone | 1.0 | 1.8 | 0.4 | 89.8 | tr. | 4.3 | 1.8 | 0.9 | 99.0 |
| Anhydrite | 5.6 | 1.5 | 37.8 | 1.9 | 54.4 | 1.4 | 2.7 | tr. | 99.7 |

Table 3
Chemical analysis and composition of clinker
Chemical analysis (wt.%)

| Ignition loss | CaO | SiO$_2$ | SO$_3$ | Fe$_2$O$_3$ | Al$_2$O$_3$ | MgO | Total |
|---|---|---|---|---|---|---|---|
| 0.4 | 81.3 | 10.8 | 4.9 | 0.8 | 0.9 | 0.5 | 99.6 |

| Composition (wt.%) | | | CaO crystals dispersed in alite crystal (wt.% based) on clinker (B) | $\frac{(B)}{(A)} \times 100$ |
|---|---|---|---|---|
| Alite | Total CaO crystals (A) | CaSO$_4$ phase | | |
| 41 | 34.8 | 8.3 | 31 | 89 |

EXAMPLE 2

Two kinds of cement additive were prepared by pulverizing the clinker prepared in Example 1 of this specification and a comparative clinker prepared in accordance with the method used in Example 3 of the U.S. Patent. The pulverization of each of said clinkers was effected to such an extent that 20 weight percent of said clinkers was retained on a sieve of 88 micron mesh sieve, and the specific surface area of each powder measured by Blaine permeability method was about 2,000 cm$^2$ per gram.

Then two types of cement mortar were prepared by mixing 94 weight parts of normal Portland cement, 6 weight parts of the respective additives obtained, 200 weight parts of Toyoura standard sand and 60 weight parts of water. The molded specimens made of these cement mortars were cured in the same manner as mentioned before. Thereafter, the cured specimens were immersed in water at 20°C to measure the linear expansion coefficients of demolded specimens corresponding to the periods of water curing, the results being presented in Table 4.

Table 4
Composition of original clinker and linear expansion coefficient of cured Mortar

| Sample | Composition of original clinker | | |
|---|---|---|---|
| | Total CaO crystals (wt.% based on clinker) (A) | CaO crystals dispersed in alite crystals (wt.% based on clinker) (B) | $\frac{(B)}{(A)} \times 100$ |
| Example 2 of this specification | 34.8 | 31 | 89 |
| Example 3 of the U.S. Patent | 35.2 | 0 | 0 |

Linear expansion coefficient of cured mortar in water ($\times 10^{-4}$)

| After 1 day | 2 days | 3 days | 5 days | 7 days | 14 days | 28 days |
|---|---|---|---|---|---|---|
| 25 | 82 | 121 | 130 | 131 | 131 | 131 |
| 29 | 42 | 45 | 47 | 47 | 47 | 47 |

Figure 2:
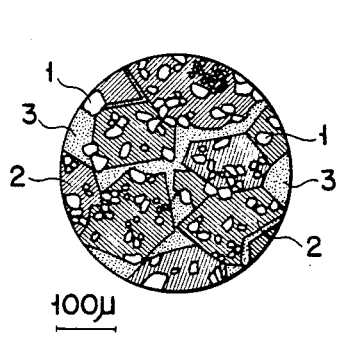
FIG. 2 is a sketch of optic-microscopical observation carried out with a sliced sample of a clinker obtained in Example 1 of this specification.
Figure 4:
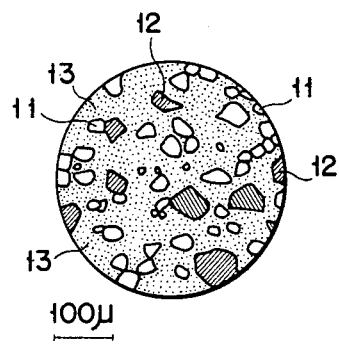
FIG. 4 is a sketch of optic-microscopical observation carried out with a sliced sample of a clinker obtained in Example 3 of the U.S. Patent.
Figure 3:
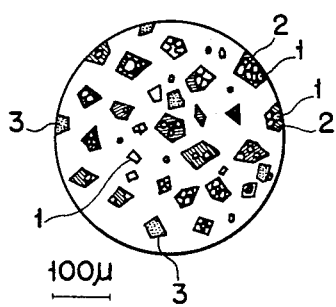
FIG. 3 is a sketch of optic-microscopical observation carried out with a pulverized clinker of FIG. 2.
Figure 5:
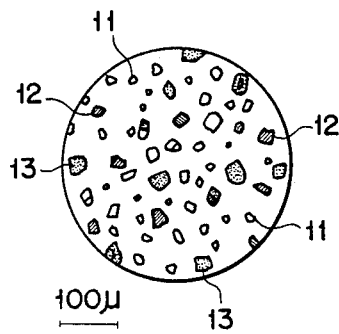
FIG. 5 is a sketch of optic-microscopical observation carried out with a pulverized clinker of FIG. 4.

A sketch of optical microscopic observation carried out with the sliced sample of clinker obtained in Example 1, above is shown in FIG. 2, and a similar sketch to the above carried out with the sample of pulverized clinker of Example 1 is shown in FIG. 3. These figures indicate calcium oxide crystal 1, alite crystal 2 and a phase of optic-microscopically amorphous calcium sulfate 3. Similar sketches of the samples obtained in Example 3 of the U.S. Patent are presented in FIGS. 4 and 5. In these figures, numerals 11, 12 and 13 indicate calcium oxide crystal, alite crystal not containing immanently calcium oxide crystals, and vitreous interstitial substance, respectively.

As is obvious from Table 4, the cement additive of this invention causes the cement mortar or concrete to provide smoother and higher chemical prestressing effectiveness than that of the U.S. Patent. These excellent effects originate from the fact that the greater part of the calcium oxide crystals are distributed immanently in the alite crystals.

What we claim is:

1. An improved expansive cement additive of pulverized clinker, whose clinker consists essentially of alite crystals containing calcium oxide crystals therein, and a phase consisting essentially of optic-microscopically amorphous calcium sulfate in which said alite crystals are dispersed; the ranges of crystal size of said alite and calcium oxide being from 50 to 800 microns and from 5 to 30 microns, respectively, and the content of calcium oxide crystals dispersed in the alite crystals being at least 20 percent by weight based on the clinker and at least 50 percent by weight based on the total calcium oxide crystals contained in the clinker.

2. An improved expansive cement additive of claim 1, wherein the content of said calcium sulfate phase is in the range of from 5 to 30 percent by weight based on the weight of said clinker.

3. An improved expansive cement additive of claim 1, wherein the pulverized clinker has such fineness that from 1 to 40 percent by weight of said clinker is retained on a sieve of 88 micron mesh.

4. A process for producing an improved expansive cement additive which comprises:

mixing raw materials of a calcareous substance, a siliceous substance and a gypsum, said mixing being so effected as to obtain a mol ratio of $CaO/SiO_2$ ranging from 4.2 to 9.2 and a mol ratio of $CaSO_4/SiO_2$ ranging from 0.12 to 1.40, and a $Fe_2O_3$ content of less than 3 percent by weight based on said clinker;

pulverizing the mixture of said raw materials;

burning said pulverized mixture in an oxidizing atmosphere at a temperature of from 1,350° to 1,550°C, said burning being stopped before decomposition of the gypsum reaches an extent of 15 to 40 weight percent to obtain a clinker; and pulverizing said clinker to such fineness than 1 to 40 percent by weight of said clinker is retained on a sieve of 88 micron mesh.

5. A process according to claim 4, wherein the calcareous substance is selected from the group consisting of lime, lime stone and calcium hydroxide.

6. A process according to claim 4, wherein the siliceous substance is selected from the group consisting of silica stone and silica sand.

7. A process according to claim 4, wherein the gypsum is selected from the group consisting of dihydrate, hemihydrate and anhydrite.

8. A process according to claim 4, wherein the pulverization of mixed raw materials is carried out to such fineness that a residue on a sieve of 88 micron mesh accounts for about 1 to 10 percent by weight based on the weight of mixture.

* * * * *